(12) United States Patent
Uehara

(10) Patent No.: US 11,922,980 B1
(45) Date of Patent: Mar. 5, 2024

(54) DISK DEVICE WITH COLUMN ATTACHED TO BASE AND COVER

(71) Applicants: Kabushiki Kaisha Toshiba, Tokyo (JP); Toshiba Electronic Devices & Storage Corporation, Tokyo (JP)

(72) Inventor: Manabu Uehara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/119,263

(22) Filed: Mar. 8, 2023

(30) Foreign Application Priority Data

Sep. 22, 2022 (JP) .................. 2022-151632

(51) Int. Cl.
*G11B 5/48* (2006.01)
*G11B 5/55* (2006.01)
*G11B 33/02* (2006.01)

(52) U.S. Cl.
CPC .......... *G11B 5/4826* (2013.01); *G11B 5/5521* (2013.01); *G11B 33/022* (2013.01)

(58) Field of Classification Search
CPC ............................ G11B 5/4826; G11B 33/022
See application file for complete search history.

(56) References Cited

U.S. PATENT DOCUMENTS

| | | | | |
|---|---|---|---|---|
| 5,099,374 A | * | 3/1992 | Ohkita | G11B 25/043 |
| 5,482,381 A | * | 1/1996 | Krum | F16C 33/80 |
| | | | | 360/265.3 |
| 5,517,374 A | * | 5/1996 | Katakura | G11B 25/043 |
| | | | | 360/99.08 |
| 5,675,456 A | * | 10/1997 | Myers | F16C 27/04 |
| | | | | 360/99.15 |
| 5,796,557 A | * | 8/1998 | Bagnell | G11B 5/5521 |
| | | | | 360/99.22 |
| 5,844,754 A | * | 12/1998 | Stefansky | G11B 5/4813 |
| | | | | 360/264.2 |
| 6,011,670 A | * | 1/2000 | Balsley, Jr. | G11B 5/5521 |
| 6,205,004 B1 | * | 3/2001 | Kim | G11B 25/043 |
| | | | | 360/99.18 |
| 6,288,879 B1 | * | 9/2001 | Misso | F16C 19/54 |
| | | | | 403/372 |
| 6,466,400 B1 | * | 10/2002 | Iwahara | G11B 17/0287 |
| 6,556,387 B1 | * | 4/2003 | Misso | G11B 5/5521 |
| 7,609,486 B1 | * | 10/2009 | Little | G11B 33/12 |
| | | | | 360/266.1 |
| 10,650,864 B1 | * | 5/2020 | Harwood | G11B 33/128 |
| 10,891,980 B1 | * | 1/2021 | Keshavan | G11B 25/043 |
| 10,978,100 B1 | * | 4/2021 | Myers | G11B 33/121 |

(Continued)

*Primary Examiner* — Brian E Miller
(74) *Attorney, Agent, or Firm* — Allen & Overy LLP

(57) ABSTRACT

According to one embodiment, a disk device includes a plurality of magnetic disks, a casing, a column, a rotary component, and a screw. The casing includes a base having an inner space in which the plurality of magnetic disks is accommodated, and a first cover attached to the base to close the space. The column with a screw hole, is located in the space and is attached to the base by being fitted into a recess formed in the base. The rotary component is located in the space, surrounds the column, and is configured to rotate about the column. The screw is fitted into the screw hole through the first cover.

3 Claims, 5 Drawing Sheets

(56) References Cited

U.S. PATENT DOCUMENTS

| | | | | |
|---|---|---|---|---|
| 2001/0038509 | A1* | 11/2001 | Lofstrom | G11B 25/043 |
| | | | | 360/99.15 |
| 2003/0053260 | A1* | 3/2003 | Barina | F16C 27/04 |
| 2004/0246627 | A1* | 12/2004 | Durrum | G11B 5/5526 |
| 2010/0128396 | A1* | 5/2010 | Haynes | G11B 5/4813 |
| | | | | 360/240 |
| 2015/0117259 | A1 | 4/2015 | Xaypanya et al. | |
| 2019/0279671 | A1* | 9/2019 | Yoshikawa | G11B 5/553 |
| 2020/0027480 | A1* | 1/2020 | Myers | H02K 7/14 |
| 2020/0251137 | A1* | 8/2020 | Kato | G11B 25/043 |

* cited by examiner

DISK DEVICE WITH COLUMN ATTACHED TO BASE AND COVER

CROSS-REFERENCE TO RELATED APPLICATIONS

This application is based upon and claims the benefit of priority from Japanese Patent Application No. 2022-151632, filed on Sep. 22, 2022, the entire contents of which are incorporated herein by reference.

FIELD

Embodiments described herein relate generally to a disk device.

BACKGROUND

Disk devices such as a hard disk drive typically include a casing that accommodates various kinds of parts and components. For example, the casing includes a column standing on the inner surface to rotatably support rotational components.

Improving peripheral design of the rotational components may facilitate the manufacture of the disk devices.

DETAILED DESCRIPTION

According to one embodiment, a disk device includes a plurality of magnetic disks, a casing, a column, a rotary component, and a screw. The casing includes a base having an inner space in which the plurality of magnetic disks is accommodated, and a first cover attached to the base to close the space. The column with a screw hole, is located in the space and is attached to the base by being fitted into a recess formed in the base. The rotary component is located in the space, surrounds the column, and is configured to rotate about the column. The screw is fitted into the screw hole through the first cover.

First Embodiment

Hereinafter, a first embodiment will be described with reference to FIGS. 1 to 3. Note that, in the present specification, constituent elements according to the embodiment and descriptions of the elements may be described in a plurality of expressions. The constituent elements and the description thereof are examples, and are not limited to the expressions of the present specification. The constituent elements may be specified using names different from those used in the present specification. In addition, the constituent elements may be described by expressions different from the expressions used in the present specification.

Figure 1:
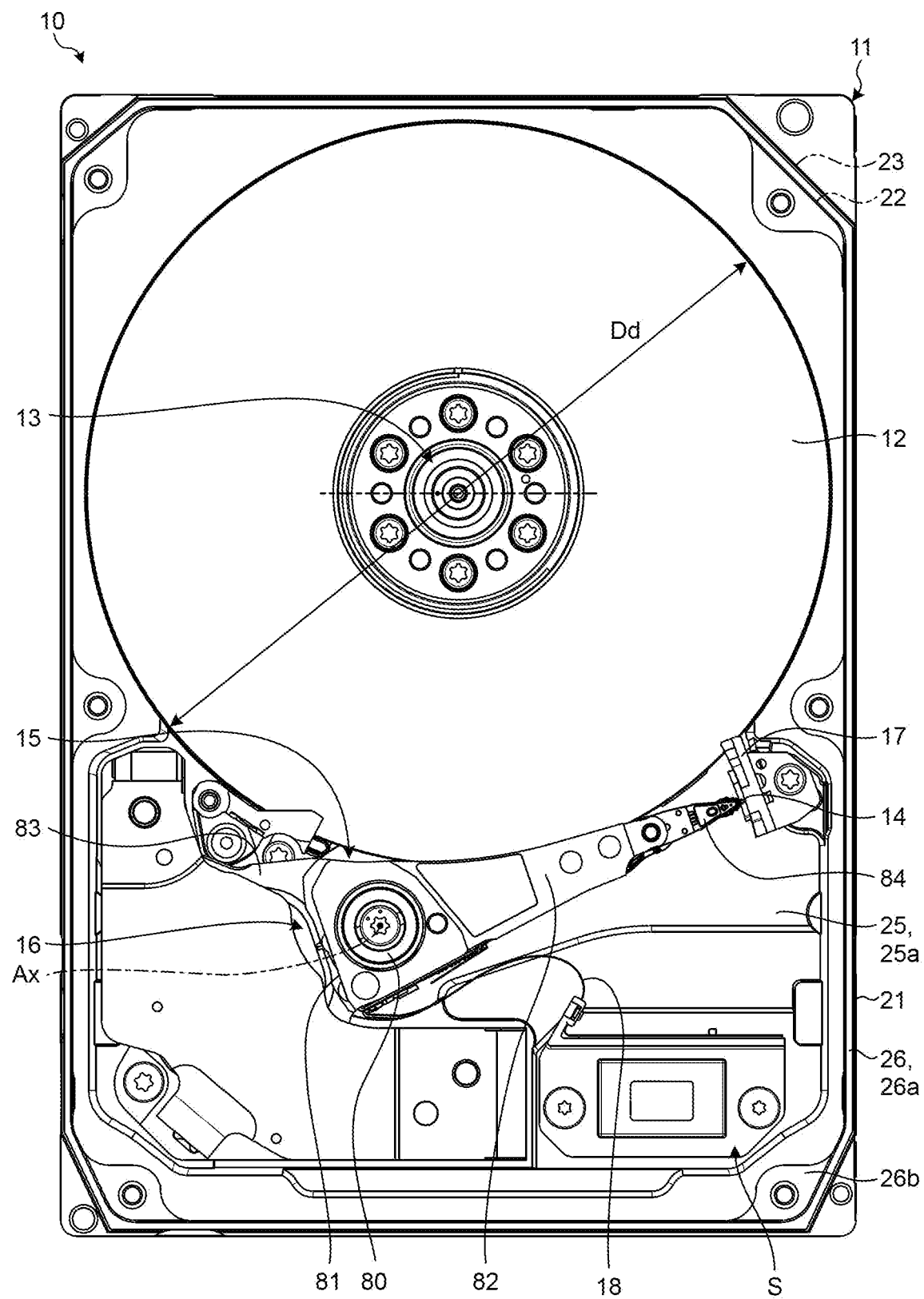
FIG. 1 is an exemplary plan view illustrating a hard disk drive (HDD) according to a first embodiment.

FIG. 1 is an exemplary plan view illustrating a hard disk drive (HDD) 10 according to the first embodiment. The HDD 10 is an example of a disk device, and may also be referred to as an electronic device, a storage device, an external storage device, or a magnetic disk device.

The HDD 10 includes a casing 11, a plurality of magnetic disks 12, a spindle motor 13, a plurality of magnetic heads 14, a head stack assembly (ESA) 15, a voice coil motor (VCM) 16, a ramp load mechanism 17, and a flexible printed circuit board (FPC) 18. The magnetic disk 12 may also be referred to as a platter or a medium. The magnetic head 14 may also be referred to as a slider. The HSA 15 is an example of a rotary component. Note that the HDD 10 may be a multi-actuator HDD including a plurality of HSAs 15.

Figure 2:
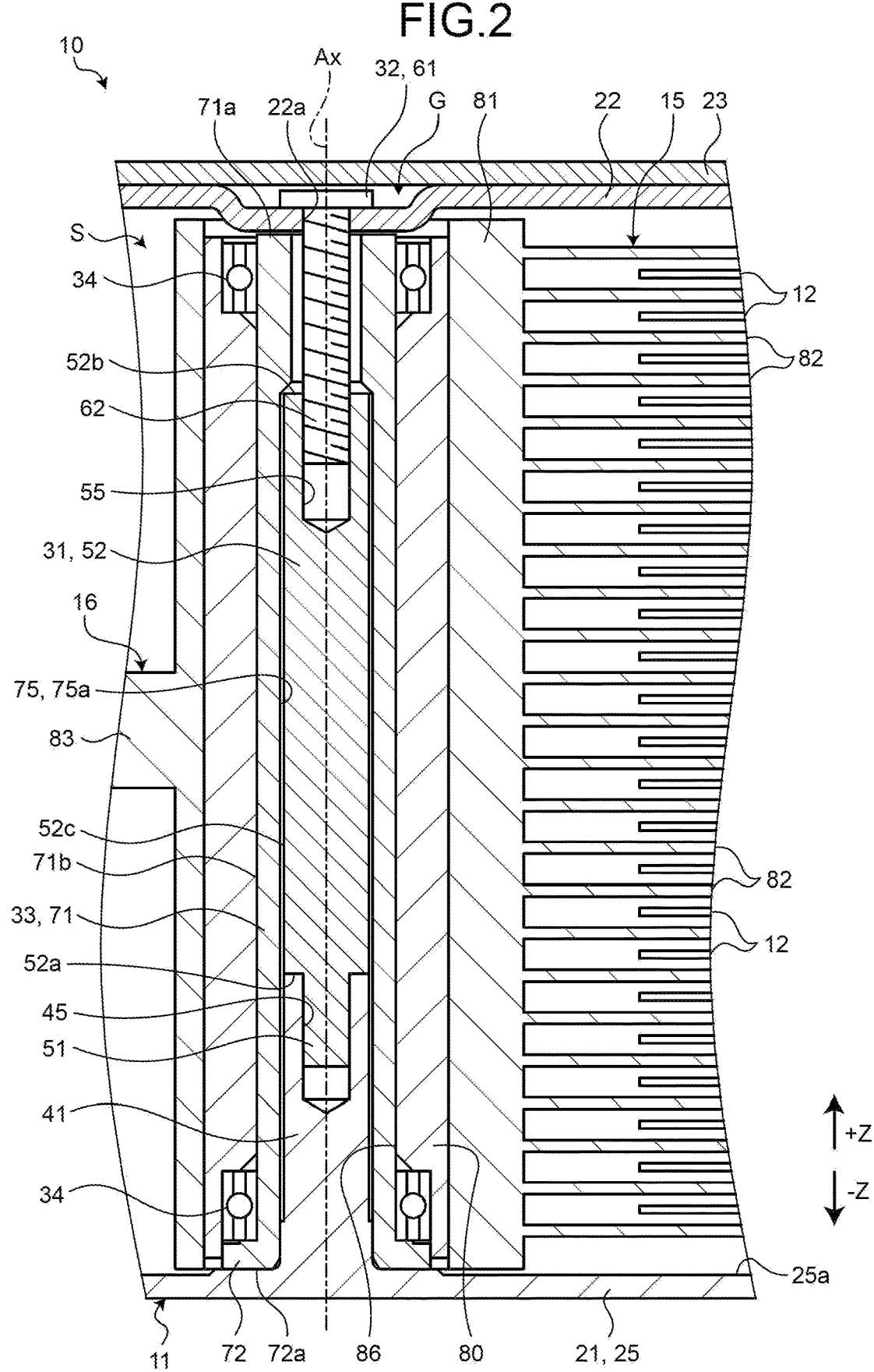
FIG. 2 is an exemplary cross-sectional view illustrating a portion of the HDD of the first embodiment.

FIG. 2 is an exemplary cross-sectional view illustrating a portion of the HDD 10 of the first embodiment. As illustrated in FIG. 2, in the present specification, a +Z direction and a −Z direction are defined for the sake of convenience. The direction is a direction along the thickness of the HDD 10. The −Z direction is a direction opposite to the +Z direction.

The casing 11 includes a base 21, an inner cover 22, and an outer cover 23. Note that the casing 11 is not limited to this example. In addition, FIG. 1 illustrates the casing 11 without the inner cover 22 and the outer cover 23 for the sake of simpler illustration. The inner cover 22 is an example of a first cover. The outer cover 23 is an example of a second cover.

The base 21, the inner cover 22, and the outer cover 23 are each made of a metal material such as an aluminum alloy, for example. Note that the base 21, the inner cover 22, and the outer cover 23 may be made of materials different from one another.

As illustrated in FIG. 1, the base 21 has a substantially rectangular parallelepiped box shape and has an inner chamber S. The inner chamber S is an example of a space. The inner chamber S is open to the outside of the base 21 in the +Z direction. The base 21 has a bottom wall 25 and a side wall 26.

The bottom wall 25 has a substantially rectangular (quadrangular) plate shape expanding substantially orthogonally to the +Z direction. The bottom wall 25 has a bottom surface 25a. The bottom surface 25a faces substantially the +Z direction as a whole. Note that the bottom surface 25a may be provided with, for example, a plurality of irregularities which may face a direction different from the +Z direction.

The side wall 26 protrudes from an edge of the bottom wall 25 substantially in the +Z direction, and has a substantially rectangular frame shape. The bottom wall 25 and the side wall 26 are integrally formed. The side wall 26 has an end surface 26a and an attachment surface 26b.

The end surface 26a is at an end of the side wall 26 in the +Z direction. The end surface 26a is substantially flat and faces substantially the +Z direction. The end surface 26a has a substantially rectangular annular shape. In other words, the end surface 26a is in an endless form.

When projected in the Z direction, the attachment surface 26b is surrounded by the end surface 26a on a projection plane. In other words, the attachment surface 26b is located inside the end surface 26a when viewed in the −Z direction. The attachment surface 26b is in the vicinity of the end surface 26a and closer to the bottom wall 25 than the end surface 26a. In other words, the attachment surface 26b is recessed substantially in the −Z direction from the end surface 26a. The attachment surface 26b is substantially flat and faces substantially the +Z direction. The attachment surface 26b has a substantially rectangular annular shape. Note that the attachment surface 26b is not limited to this example.

The inner cover 22 is supported by the attachment surface 26b of the side wall 26. The inner cover 22 is attached to the attachment surface 26b with, for example, screws to close the inner chamber S. For example, a gap between the inner cover 22 and the attachment surface 26b may be hermetically sealed with a gasket. The bottom surface 25a of the bottom wall 25 faces the inner cover 22 through the inner chamber S.

The outer cover 23 covers the inner cover 22 and is supported by the end surface 26a of the side wall 26. The outer cover 23 is attached to the end surface 26a by, for example, welding, and hermetically seals the inside of the casing 11. The inner chamber S and a gap 0 between the inner cover 22 and the outer cover 23 are inside the casing 11, as illustrated in FIG. 2.

The casing 11 is filled with a gas different from air. For example, the casing 11 is filled with a low-density gas with lower density than air, an inert gas with low reactivity, or the like. In the present embodiment, the casing 11 is filled with helium. Note that the casing 11 may be filled with another fluid.

The casing 11 accommodates the plurality of magnetic disks 12, the spindle motor 13, the plurality of magnetic heads 14, the HSA 15, the VON 16, the ramp load mechanism 17, and the FPC 18 in the inner chamber S. In other words, the plurality of magnetic disks 12, the spindle motor 13, the plurality of magnetic heads 14, the HSA 15, the VCM 16, the ramp load mechanism 17, and the FPC 18 are located in the inner chamber S.

The plurality of magnetic disks 12 expands orthogonally to the +Z direction. Each magnetic disk 12 has an upper surface and a lower surface having magnetic recording layers individually formed thereon. The plurality of magnetic disks 12 are arranged at intervals in the +Z direction.

The HDD 10 of the present embodiment is a 3.5-inch HDD. The plurality of magnetic disks 12 illustrated in FIG. 1 each have a diameter Dd of, for example, 20 mm or more and 100 mm or less. Specifically, the diameter Dd is set to about 96 mm. In addition, the plurality of magnetic disks 12 have a thickness of about 0.635 mm. Note that the dimensions of the magnetic disk 12 are not limited to this example.

The spindle motor 13 supports and rotates the plurality of magnetic disks 12 stacked at intervals in the 7, direction. The plurality of magnetic disks 12 are held on a hub of the spindle motor 13 with a clamp spring, for example.

The magnetic head 14 records and reproduces information on and from the recording layers of the magnetic disk 12. In other words, the magnetic head 14 reads and writes information from and to the magnetic disk 12. The magnetic head 14 is attached to a flexure included in the HSA 15.

The HSA 15 is rotatably attached to the casing 11 away from the magnetic disks 12 in a direction substantially orthogonal to the ±Z direction. The VCM 16 rotates the HSA 15 to move the magnetic heads 14 attached to the HSA 15 to a desired position. The ramp load mechanism 17 holds the magnetic heads 14 moved to the outermost periphery of the magnetic disks 12 at an unloaded position separated from the magnetic disks 12.

The FPC 18 has an end portion connected to flexures included in the HSA 15. The FPC 18 is electrically connected to the magnetic heads 14 through the flexures. The FPC 18 has the other end Portion electrically connected to a substrate located outside the casing 11 via a connector provided on the bottom wall 25.

As illustrated in FIG. 2, the HDD 10 further includes a column 31, a screw 32, a shaft 33, and two bearings 34. The column 31, the shaft 33, and the bearings 34 are located in the inner chamber S.

The HSA 15 is attached to the casing 11 via the column 31, the screw 32, the shaft 33, and the two bearings 34. The HSA 15 is rotatable about an axis Ax. The axis Ax is the center of rotation of the HSA 15 and the axis of the column 31, the screw 32, the shaft 33, and the bearings 34. Note that at least one of the center of rotation of the HSA 15 and the axes of the column 31, the screw 32, the shaft 33, and the bearings 34 may be slightly different from the others.

Hereinafter, an axial direction, a radial direction, and a circumferential direction are defined for the sake of convenience. The axial direction is a direction along the axis Ax. In the present embodiment, the axis Ax extends in the +Z direction and the −Z direction. Therefore, the axial direction includes the direction and the −Z direction. The radial direction is direction orthogonal to the axis Ax and includes a plurality of directions orthogonal to the axis Ax. The circumferential direction is a direction rotating about the axis Ax and includes a direction rotating clockwise about the axis Ax and a direction rotating counterclockwise about the axis Ax.

The column 31 is made, of a metal material such as an aluminum alloy, for example. That is, the column 31 is made of the same material as the base 21. Note that the column 31 may be made of another material such as stainless steel. The column 31 is attached to the base 21.

In the present embodiment, the base 21 further includes a protrusion 41 to which the column 31 is attached. The protrusion 41 is located apart from the magnetic disks 12 in a direction orthogonal to the axial direction. The protrusion 41 protrudes from the bottom surface 25a of the bottom wall 25 substantially in the +Z direction. In other words, the protrusion 41 protrudes from the bottom surface 25a toward the inner cover 22.

The protrusion 41 has a substantially circular columnar shape extending along the axis Ax. The axis of the protrusion 41 coincides with the axis Ax. In other words, the column 31, the screw 32, the shaft 33, the bearings 34, and the protrusion 41 are concentric to one another. Note that the axis of the protrusion 41 may be slightly different from the axis Ax.

Figure 3:
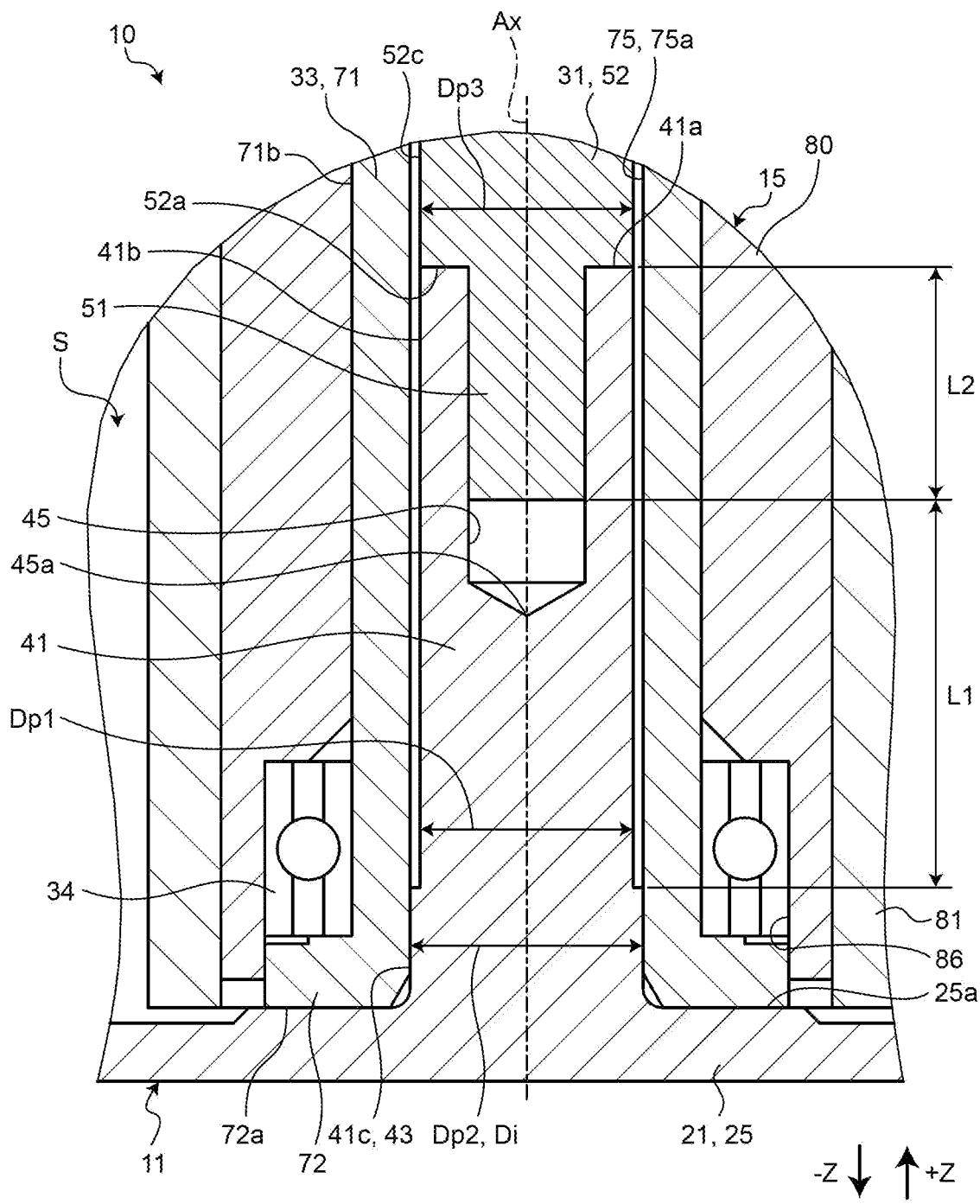
FIG. 3 is an exemplary cross-sectional view illustrating a portion of the HDD around a protrusion of the first embodiment.

FIG. 3 is an exemplary cross-sectional view illustrating a portion of the HDD 10 around the protrusion 41 of the first embodiment. As illustrated in FIG. 3, the protrusion 41 has an end surface 41a and two outer peripheral surfaces 41b and 41c. The outer peripheral surface 41b is an example of a first outer peripheral surface. The outer peripheral surface 41c is an example of a second outer peripheral surface.

The end surface 41a is at an end of the protrusion 41 in the +z direction. The end surface 41a is a substantially circular flat surface and faces substantially the +Z direction. The outer peripheral surface 41b is a substantially cylindrical curved surface extending from an edge of the end surface 41a substantially in the −Z direction. The outer peripheral surface 41b faces outward in the radial direction.

The protrusion 41 further includes a step 43. The step 43 protrudes from the outer peripheral surface 41b outward in the radial direction. The outer peripheral surface 41c is a substantially cylindrical curved surface provided on the step 43 and faces outward in the radial direction.

The step 43 and the outer peripheral surface 41c are adjacent to the bottom wall 25. The outer peripheral surface 41c is connected to the bottom surface 25a of the bottom wall 25 directly or via a chamfered curved surface. The outer peripheral surface 41c is thus closer to the bottom surface 25a than the outer peripheral surface 41b. Note that the step 43 and the outer peripheral surface 41c may be separated from the bottom surface 25a. In addition, another portion may be provided between the step 43 and the outer peripheral surface 41c, and the bottom surface 25a.

The outer peripheral surface 41b has a diameter Dp1 smaller than a diameter Dp2 of the outer peripheral surface 41c. The diameter Dp1 of the outer peripheral surface 41b may not be constant. In this case, the diameter Dp1 is the maximum diameter of the outer peripheral surface 41b. The diameter Dp2 of the outer peripheral surface 41c is substantially constant.

The protrusion 41 is provided with a recess 45. The recess 45 may also be referred to as a hole, a concave, or a non-through hole. The recess 45 is in the end surface 41a of the protrusion 41. The recess 45 is recessed from the end surface 41a substantially in the −z direction and is a substantially circular columnar hole along the axis Ax. The recess 45 has a bottom 45a and does not pass through the base 21.

The column 31 includes a fitting part 51 and an extending part 52. The fitting part 51 is a substantially circular columnar part along the axis Ax. The fitting part 51 is slightly greater in diameter than the recess 45. For example, the fitting part 51 is press-fitted into the recess 45 of the protrusion 41. In this manner, the column 31 is attached to the protrusion 41 of the base 21.

The fitting part 51 is not limited to the above example. For example, the fitting part 51 may be provided with male threads and the recess 45 may have an inner surface provided with female threads. In this case, the fitting part 51 is fitted into the recess 45 while the male threads of the fitting part 51 and the female threads of the recess 45 mesh with each other. In addition, the fitting part 51 may be loosely press-fitted into the recess and bonded to the protrusion 41 with an adhesive.

The outer peripheral surface 41c of the protrusion 41 is apart from the fitting part 51 toward the bottom surface 25a of the bottom wall 25. In other words, the outer peripheral surface 41c and the fitting part 51 are at different positions in the axial direction. For example, in the axial direction, a distance L1 between the outer peripheral surface 41c and the fitting part 51 is greater than a length L2 of the fitting part 51. In addition, the outer peripheral surface 41c is apart from the bottom 45a of the recess 45 toward the bottom surface Note that the position of the outer peripheral surface 41c is not limited to this example.

The extending part 52 extends from a +Z directional end of the fitting part 51 in the +z direction. The extending Part 52 has a substantially circular columnar shape along the axis Ax. As illustrated in FIG. 2, the extending part 52 has two end surfaces 52a and 52b and an outer peripheral surface 52c.

The end surface 52a is at an end of the extending part 52 in the −Z direction. The end surface 52a is a substantially circular flat surface and faces substantially the −Z direction. The fitting part 51 protrudes from the end surface 52a in the −Z direction.

The end surface 52b is at an end of the extending part 52 in the +Z direction. The end surface 52b is a substantially circular flat surface and faces substantially the +Z direction. The column 31 is apart from the inner cover 22 in the −Z direction. The end surface 52b faces the inner cover 22 with an interval.

The outer peripheral surface 52c is a substantially cylindrical curved surface extending along the axis Ax between an edge of the end surface 52a and an edge of the end surface 52b. As illustrated in FIG. 3, the outer peripheral surface 52c has a diameter Dp3 less than or equal to the diameter Dp1 of the outer peripheral surface 41b of the protrusion 41. Note that the diameter Dp3 of the outer peripheral surface 52c is greater than the diameter of the fitting part 51.

As illustrated in FIG. 2, the extending part 52 is provided with a screw hole 55 in the end surface 52b. The screw hole 55 extends from the end surface 52b substantially in the −Z direction. The screw hole 55 has an inner surface with female threads. The screw hole 55 does not extend through the column 31 and is apart from the fitting part 51 in the +Z, direction.

The screw 32 includes a screw head 61 and a screw shaft 62. The screw head 61 is located in the gap G between the inner cover 22 and the outer cover 23. The screw shaft 62 extends from the screw head 61 substantially in the −z direction.

The screw shaft 62 is screwed into the screw hole of the column 31 through a hole 22a formed in the inner cover 22. The screw shaft 62 is fitted into the screw hole while the male threads of the screw shaft 62 and the female threads of the screw hole 55 mesh with each other. In this manner, the screw 32 is fitted into the screw hole through the inner cover 22.

The screw 32 loins the column 31 and the inner cover 22 to each other and fixes the column 31 at a predetermined position on the axis Ax. Thereby, the screw 32 prevents the axis of the column 31 from tilting with respect to the axis Ax.

The hole 22a passes through the inner cover 22 along the axis Ax and allows communication between the inner chamber S and the gap G. However, the outer cover 23 hermetically seals the gap G, and the inner chamber S is not in communication with the outside of the casing 11.

The shaft 33 includes a cylinder 71 and a flange 72. The cylinder 71 has a substantially cylindrical shape along the axis Ax. The cylinder 71 is provided with an inner through hole 75. The through hole 75 is a substantially circular columnar hole and extends through the cylinder 71 along the axis Ax. The cylinder 71 accommodates the column 31, the protrusion 41, and the screw shaft 62 of the screw 32 in the through hole 75. The cylinder 71 has an end surface 71a, an outer peripheral surface 71b, and an inner surface 75a of the through hole 75. The inner surface 75a is included in the cylinder 71 and defines the through hole 75.

The end surface 71a is at an end of the cylinder 71 in the +Z direction. The end surface 71a is an end surface of the shaft 33 in the +Z direction. The end surface 71a is a substantially circular flat surface and faces substantially the +Z direction. The through hole 75 opens to the end surface 71a. The end surface 71a is supported by the inner cover 22. Note that the end surface 71a may be separated from the inner cover 22. The outer peripheral surface 71b is a substantially cylindrical curved surface extending from an outer edge of the end surface 71a substantially in the −Z direction. The outer peripheral surface 71b faces outward in the radial direction.

The inner surface 75a of the through hole 75 is opposite to the outer peripheral surface 71b. The inner surface 75a is a substantially cylindrical curved surface extending from an inner edge of the end surface 71a substantially in the −Z direction. The inner surface 75a faces inward in the radial direction.

As illustrated in FIG. 3, the inner surface 75a faces the outer peripheral surfaces 41b and 41c of the protrusion 41 and the outer peripheral surface 52c of the extending part 52. The outer peripheral surfaces 41b and 41c and the outer peripheral surface 52c face the inner surface 75a. As illustrated in FIG. 2, the inner surface 75a may face the screw shaft 62 of the screw 32.

As illustrated in FIG. 3, the inner surface 75a has a diameter Di greater than the diameter Dp1 of the outer peripheral surface 41b and greater than, the diameter Dp3 of the outer peripheral surface 52c. Thus, the outer peripheral surface 41b, the outer peripheral surface 52c, and the screw shaft 62 are away from the inner surface 75a.

The diameter Di of the inner surface 75a is substantially equal to the diameter Dp2 of the outer peripheral surface 41c. The step 43 including the outer peripheral surface 41c is fitted into the through hole 75 of the cylinder 71 and the outer peripheral surface 41c contacts with the inner surface 75a to hold the cylinder 71 on the protrusion 41. In other words, the outer peripheral surface 41c functions to position the cylinder 71 by contacting with the inner surface 75a. The cylinder 71 may be attached to the protrusion 41 by contact between the outer peripheral surface 41c and the inner surface 75a.

The flange 72 is located at an end of the cylinder 71 in the −z direction. The flange 72 protrudes from the outer peripheral surface 71b of the cylinder 71 outward in the radial direction. The flange 72 has an end surface 72a. The end surface 72a is provided at an end of the flange 72 in the −z direction. The end surface 72a is an end surface of the shaft 33 in the −z direction.

The end surface 72a is a substantially circular flat surface and faces substantially the −z direction. The end surface 72a of the flange 72 is larger than the end surface 71a of the cylinder 71. The end surface 72a is supported by the bottom surface 25a of the bottom wall 25. Note that the flange 72 may be separated from the bottom surface 25a.

The bearings 34 are, for example, ball bearings. Note that the bearings 34 may be other bearings. The bearings 34 are attached to the outer peripheral surface 71b of the cylinder 71. As illustrated in FIG. 2, the two bearings 34 are separated from each other in the axial direction. One bearing 34 is located in the vicinity of the flange 72 and surrounds the protrusion 41 via the cylinder 71. The other bearing 34 is located in the vicinity of the end surface 71a of the cylinder 71.

As illustrated in FIG. 1, the HSA 15 includes a sleeve 80, an actuator block 81, a plurality of arms 82, a coil holder 83, and a plurality of head gimbal assemblies (HSA) 84. The HSA 15 may further include other components such as a plurality of microactuators.

The sleeve 80 has a substantially cylindrical shape along the axis Ax. As illustrated in FIG. 2, a through hole 86 is formed inside the sleeve 80. The through hole 86 is a substantially circular columnar hole passing through the sleeve 80 along the axis Ax.

The sleeve 80 accommodates the column 31, the screw shaft 62 of the screw 32, the shaft 33, the bearings 34, and the protrusion 41 in the through hole 86. In other words, the sleeve 80 surrounds the column 31, the shaft 33, the bearings 34, the protrusion 41, and the screw shaft 62. Thus, the cylinder 71 of the shaft 33 is interposed between the column 31 and the actuator block 81 of the HSA 15.

The sleeve 80 is attached to the shaft 33 via the bearings 34. Thereby, the HSA 15 is attached to the column 31 via the bearings 34, the shaft 33, and the protrusion 41.

The actuator block 81 has a substantially rectangular parallelepiped shape extending in the axial direction, for example. The sleeve 80 is attached inside the actuator block 81. Note that the sleeve 80 and the actuator block 81 may be integrally formed.

The plurality of arms 82 protrudes from the actuator block 81 in the radial direction. The plurality of arms 82 is arranged at intervals in the axial direction. The plurality of arms 82 has a plate shape to enter the space between the two adjacent magnetic disks 12. The plurality of arms 82 extends substantially in parallel.

The coil holder 83 protrudes from the actuator block 81 in a direction opposite to the direction in which the arms 82 protrude. The coil holder 83 holds a voice coil of the VCM 16. The VCM 16 includes the voice coil, pair of yokes, and a magnet provided on the yokes.

As illustrated in FIG. 1, the plurality of HGAs 84 are each attached to a corresponding one of the plurality of arms 82. The plurality of HGAs 84 each include a base plate, a load beam, and a flexure.

The base plate is attached to a distal end of the arm 82. The load beam has a plate shape thinner than the base plate. The load beam is attached to a distal end of the base plate and protrudes from the base plate.

The flexure is a multi-layer plate including a metal plate (backing layer) made of, for example, stainless steel, an insulating layer formed on the metal plate, a conductive layer formed on the insulating layer and constituting a plurality of wiring lines (wiring patterns), and a protective layer (insulating layer) covering the conductive layer. The flexure includes a displaceable gimbal (elastic support) at one end above the load beam. The magnetic head 14 is mounted on the gimbal. The flexure is connected to the FPC 13 at the other end.

The VCM 16 rotates the HSA 15 about the axis Ax. In other words, the HSA 15 rotates about the column 31. The HSA 15 rotates to move the magnetic head 14 about the column 31.

A maximum axial dimension (thickness) of the casing 11 is set to 26.2 mm or more. The Small Form Factor Committee defined a 3.5-inch hard disk drive form factor SFF-8300, which specifies multiple maximum dimensions (hereinafter, referred to as specified dimensions) of the HDD in the Z direction. The specified dimensions defined in SFF-8300 includes 26.10 mm. That is, in the present embodiment the maximum thickness of the casing 11 is greater than this specified dimension.

The maximum thickness of the casing 11 in the present embodiment is set to, for example, greater than 42 mm and 54 mm or less. Specifically, the maximum thickness of the casing 11 in the present embodiment is set to about 53.7 mm. The specified dimensions defined in SFF-8300 include 42.00 mm. That is, in the present embodiment the maximum thickness of the casing 11 is greater than this specified dimension.

The casing 11 of the present embodiment is greater in maximum thickness than the casing of a typical HDD. Thus, the inner chamber S is larger than the internal space of a typical HDD. In the present embodiment the number of the magnetic disks 12 accommodated in the inner chamber S is 20 or more, for example. Note that the number of the magnetic disks 12 is not limited to this example.

The HDD 10 of the present embodiment is manufactured as follows, for example. Note that the method of manufacturing the HDD 10 is not limited to the method described below. First, the fitting part 51 of the column 31 is press-fitted into the recess 45 of the protrusion 41.

When the fitting part 51 is press-fitted into the recess 45, the protrusion 41 may be deformed. For example, a portion of the outer peripheral surface 41b may bulge outward in the radial direction. However, the maximum diameter Dp1 of the outer peripheral surface 41b is smaller than the diameter Dp2 of the outer peripheral surface 41c.

Next, the shaft 33 is attached to the protrusion 41. The outer peripheral surface 41c comes into contact with the inner surface 75a of the through hole 75 to position the shaft 33 such that the axis of the shaft 33 coincides with the axis Ax of the protrusion 41.

Next, the HSA 15 is attached to the shaft 33 via the bearings 34. Note that the bearings 34 and the HSA 15 may be attached to the shaft 33 in advance before the shaft 33 is attached to the protrusion 41.

Next, the inner cover 22 is attached to the side wall 26 of the base 21 with, for example, screws. Note that the magnetic disks 12, the spindle motor 13, the magnetic heads 14, the VCM 16, the ramp load mechanism 17, and the FPC 18 are accommodated in the inner chamber S before the inner cover 22 is attached to the side wall 26.

Next, the screw 32 passes through the hole 22a and is fitted into the screw hole 55 of the column 31. Accordingly, the screw 32 fixes the column 31 such that the axis of the column 31 coincides with the axis Ax of the protrusion 41.

Next, the outer cover 23 is attached to the side wall 26 of the base 21 by, for example, welding. Next, for example, the air inside the casing 11 is removed through a hole formed in the outer cover 23, and helium is filled inside the casing 11. Next, for example, the hole formed in the outer cover 23 is sealed with sealing. As a result, the HDD 10 is manufactured.

In the present embodiment, the column 31 and the protrusion 41 support the HSA 15 via the shaft 33 and the bearings 34. Further, the screw 32 is fitted into the screw hole 55 of the column 31. However, in general, the base 21 may integrally include a support protrusion with a screw hole instead of the column 31 and the protrusion 41 of the present embodiment.

For example, in a case where the casing 11 has a large maximum thickness as in the present embodiment, the above-described support protrusion may be formed long. In this case, when the base 21 is cast, molten metal (liquid metal) hardly flows into the cavity of a mold for forming the support protrusion. Therefore, blowholes may be produced inside the support protrusion, or it may be difficult to form the support protrusion.

In the present embodiment, the column 31 that is a component different from the protrusion 41 is attached to the protrusion 41. Therefore, the protrusion 41 can be formed relatively short. The short protrusion 41 can prevent blowholes from being produced, and can be easily formed. In addition, the column 31 can be easily manufactured by, for example, cutting.

On the other hand, the above-described support protrusion may be formed short and the screw shaft 62 of the screw 32 may be formed long. In this case, when the screw 32 tilts, the positional displacement of the distal end of the screw shaft 62 increases. Therefore, it may be difficult to insert the screw shaft 62 into the screw hole of the support protrusion.

In the present embodiment, the column 31 is a component different from the protrusion 41 and provided with the screw hole 55. The column 31 can thus have a relatively long length to allow the screw hole 55 to be formed in the vicinity of the hole 22a of the inner cover 22. In this case, the screw shaft 62 can be of a short length to be easily insertable into the screw hole 55.

In addition, in general, instead of the column 31 and the protrusion 41 in the present embodiment, a support column that is a component different from the base 21 may be fitted into a through hole formed in the bottom wall 25. In this case, since the through hole is formed in the bottom wall 25, there is a possibility that the gas inside the casing 11 leaks.

In the present embodiment, the column 31 is fitted into the recess 45 that does not pass through the base 21. Thereby, the casing 11 can be prevented from a gas leak from inside without the necessity to form a through hole in the base 21.

In the HDD 10 according to the first embodiment described above, the casing 11 includes the base 21 and the inner cover 22. The base 21 has the inner chamber S in which the plurality of magnetic disks 12 is accommodated. The inner cover 22 is attached to the base 21 to close the inner chamber S. The column 31 is located in the inner chamber S and attached to the base 21 by being fitted into the recess 45 formed in the base 21. The column 31 is provided with the screw hole 55. The HSA 15 is located in the inner chamber S to surround the column 31 and rotate about the column 31. The screw 32 is fitted into the screw hole 55 through the inner cover 22. That is, one end of the column 31 is attached to the recess 45 of the base 21 while the other end is attached to the inner cover 22 with the screw 32.

With respect to an integration of the above elongated support protrusion and the base 21, it is typically difficult to manufacture such an integrated structure by, for example, casting. For example, molten metal is difficult to flow into the cavity for forming the support protrusion in the mold, and may cause blowholes. On the other hand, with respect to a long-length screw 32 and an integration of a short-length support protrusion and the base 21, it is difficult to insert the screw 32 into the screw hole 55 of the support protrusion.

In the HDD 10 of the present embodiment, the column 31 is a component different from the base 21 and attached to the base 21. This makes it easier to manufacture the elongated column 31 with higher precision. In addition, the longer-length column 31 can facilitate insertion of the screw 32 into the screw hole 55 of the column 31. As such, the HDD 10 can be easily manufactured. Further, the column 31 is fitted into the recess 45 rather than the hole extending through the base 21, which can avoid impairing the airtightness of the inner chamber S inside the base 21.

The base 21 has the bottom surface 25a facing the inner cover 22 and the protrusion 41 protruding from the bottom surface 25a toward the inner cover 22. The protrusion 41 is provided with the recess 45. Thus, the protrusion 41 integrated with the base 21 can support the HSA 15 together with the column 31.

The cylinder 71 is provided with the inner through hole 75. The cylinder 71 accommodates the protrusion 41 and the column 31 in the through hole 75 and is interposed between the column 31 and the HSA 15. The protrusion 41 has the outer peripheral surface 41b and the outer peripheral surface 41c. The outer peripheral surface 41b faces the inner surface 75a of the through hole 75 with spacing. The outer peripheral surface 41c is closer to the bottom surface 25a than the outer peripheral surface 41b, and holds the cylinder 71 on the protrusion 41 by contacting with the inner surface 75a of the through hole 75. The column 31 includes the fitting part 51 fitted into the recess 45. The outer peripheral surface 41c is apart from the fitting part 51 toward the bottom surface 25a. In the case of press-fitting or screwing the fitting part 51 into the recess 45, for example, the protrusion 41 may be deformed around the recess 45. However, in the present embodiment, the outer peripheral surface 41c is away from the fitting part 51, therefore, it can be prevented from being affected by the deformation of the protrusion 41 due to the fitting part 51. Further, of the protrusion 41, the outer peripheral surface 41c close to the bottom surface is in contact with the inner surface 75a of the through hole 75 but the outer peripheral surface 41b of the protrusion 41 far from the bottom surface 25a is apart from the inner surface 75a of the through hole 75. Because of this, the outer peripheral surface 41b can be prevented from contacting with the inner surface 75a of the through hole 75 even if the outer peripheral surface 41b is affected by the deformation of the protrusion 41 due to the fitting part 51. As such, the HDD 10 of the present embodiment can prevent the deformed protrusion 41 due to the fitting part 51 from changing the cylinder 71 in position and inclination with respect to the protrusion 41.

In the direction along the axis Ax of the column 31, the distance L1 between the outer peripheral surface 41c and the fitting part 51 is greater than the length L2 of the fitting part 51. Thereby, the outer peripheral surface 41c can be prevented from being affected by the deformation of the protrusion 41 due to the fitting part 51.

The fitting part 51 is press-fitted into the recess 45. The protrusion 41 may be deformed around the recess 45 by press-fitting the fitting part 51 into the recess 45. However, as described above, the HDD 10 of the present embodiment can avoid the deformed protrusion 41 due to the fitting part 51 from changing the cylinder 71 in position and inclination with respect to the protrusion 41.

The HSA 15 has the magnetic heads 14 attached thereto and moves the magnetic heads 14 about the column 31. That is, the column 31 is the center of rotation of the magnetic heads 14. According to the HDD 10 of the present embodiment, the column 31 can be manufactured with high precision so that the magnetic heads 14 can be more accurately positioned.

The casing 11 includes the outer cover 23 attached to the base 21 and covering the inner cover 22. The outer cover 23 hermetically seals the inside of the casing 11 including the inner chamber S. The casing 11 is filled with a gas different from air. Thus, depending on the characteristics of the gas, the HDD 10 of the present embodiment can decrease, for example, vibration of the magnetic disks 12 due to wind and power consumption of the spindle motor 13 that rotates the magnetic disks 12. In addition, the column 31 is fitted into the recess 45 rather than the hole extending through the base 21, leading to preventing the gas from leaking to the outside of the casing 11.

The gas contains helium. Helium is lower in density than air. Due to this, the HDD 10 of the present embodiment can decrease, for example, vibration of the magnetic disks 12 due to wind and power consumption of the spindle motor that rotates the magnetic disks 12.

The column 31 is apart from the inner cover 22. The column 31 can be thus avoided from interfering with the inner cover 22.

The column 31 is made of the same material as the base 21. As such, the column 31 and the base 21 substantially coincide with each other in terms of thermal expansion coefficient. That is, the rotation of the HSA 15 can be prevented from being affected by a difference in thermal expansion coefficient between the column 31 and the base 21.

The maximum dimension of the casing 11 is 26.2 mm or more in the direction along the central axis Ax of the column 31. Thus, the column 31 has a relatively long length. However, the HDD 10 of the present embodiment allows the longer-length column 31 to be easily manufactured with high precision, and the manufacture of the HDD 10 can be facilitated.

The maximum dimension of the casing 11 is greater than 42 mm and 54 mm or less in the direction along the axis Ax of the column 31. Thus, the column 31 has a relatively long length. However, the HDD 10 of the present embodiment allows the longer-length column 31 to be easily manufactured with high precision, and the manufacture of the HDD 10 can be facilitated.

The number of the magnetic disks 12 is 20 or more. This may lead to elongation of the column 31. However, the HDD 10 of the present embodiment allows the longer-length column 31 to be easily manufactured with high precision, and the manufacture of the HDD 10 can be facilitated.

One of the two bearings 34 surrounds the protrusion 41. The one bearing 34 can be placed in the vicinity of the bottom surface 25a to set a longer distance between the two bearings 34. Further, the two bearings 34 can be arranged symmetrically with respect to the center of the inner chamber S in the axial direction. As such, the two bearings can stably support the HSA 15.

Second Embodiment

Hereinafter, a second embodiment will be described with reference to FIGS. 4 and 5. Note that, in the following description of the embodiment, there may be a case in which constituent elements having functions similar to those of the constituent elements already described are denoted by the same reference numerals as those of the constituent elements already described, and the description thereof is omitted. In addition, a plurality of constituent elements denoted by identical reference numerals do not necessarily have all the functions and properties in common, but may have different functions and properties according to each embodiment.

Figure 4:
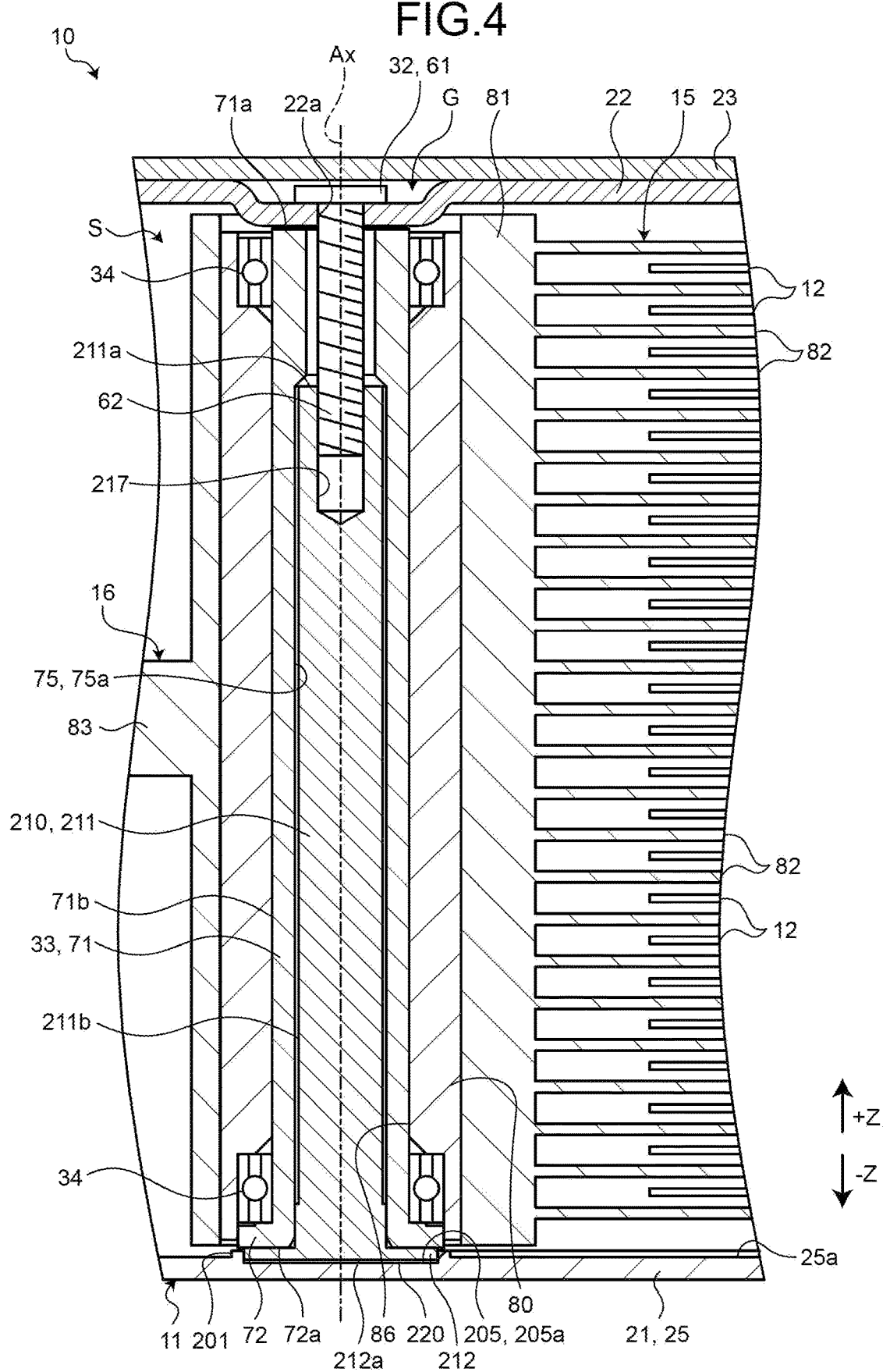
FIG. 4 is an exemplary cross-sectional view illustrating a portion of an HDD according to a second embodiment.

FIG. 4 is an exemplary cross-sectional view illustrating a portion of the HDD 10 according to a second embodiment. FIG. 5 is an exemplary cross-sectional view illustrating a portion of the HDD 10 around the protrusion 41 of the second embodiment. As illustrated in FIG. 5, the base 21 of the second embodiment does not include the protrusion 41, but includes a protrusion 201. The protrusion 201 protrudes from the bottom surface 25a of the bottom wall 25 substantially in the +Z direction. The protrusion 201 has a substantially circular annular shape extending in the circumferential direction.

The base 21 is provided with a recess 205. In the present embodiment, the recess 205 is formed inside, the protrusion 201. The recess 205 is a substantially circular columnar hole along the axis Ax recessed from the bottom surface 25a of the bottom wall 25 substantially in the −Z direction. The recess 205 does not pass through the base 21 and has a bottom surface 205a. The bottom surface 205a is a substantially circular flat surface and faces substantially the +Z direction.

The recess 205 may not be recessed from the bottom surface 25a of the bottom wall 25. For example, the bottom surface 205a of the recess 205 may be closer to the inner cover 22 than the bottom surface 25a of the bottom wall 25. In this case, the recess 205 is a hole recessed from a +Z directional end of the protrusion 201 substantially in the −Z direction.

The HDD 10 of the second embodiment includes a column 210 instead of the column 31. The column 210 is substantially equal to the column 3i of the first embodiment except for the points described below. The column 210 of the second embodiment includes a support column 211 and a flange 212.

The support column 211 has a substantially circular columnar shape extending along the axis Ax. The support column 211 has an end surface 211a illustrated in FIG. 4 and two outer peripheral surfaces 211b and 211c illustrated in FIG. 5. The outer peripheral surface 211c is an example of a third outer peripheral surface.

As illustrated in FIG. 4, the end surface 211a is provided at an end of the support column 211 in the direction. The end surface 211a is an end surface of the column 210 in the +z direction. The end surface 211a is a substantially circular flat surface and faces substantially the +z direction. The column 210 is separated from the inner cover 22 in the −Z direction. Therefore, the end surface 211a faces the inner cover 22 with an interval. The outer peripheral surface 211b is a substantially cylindrical curved surface extending from an edge of the end surface 211a substantially in the −Z direction. The outer peripheral surface 211b faces outward in the radial direction.

Figure 5:
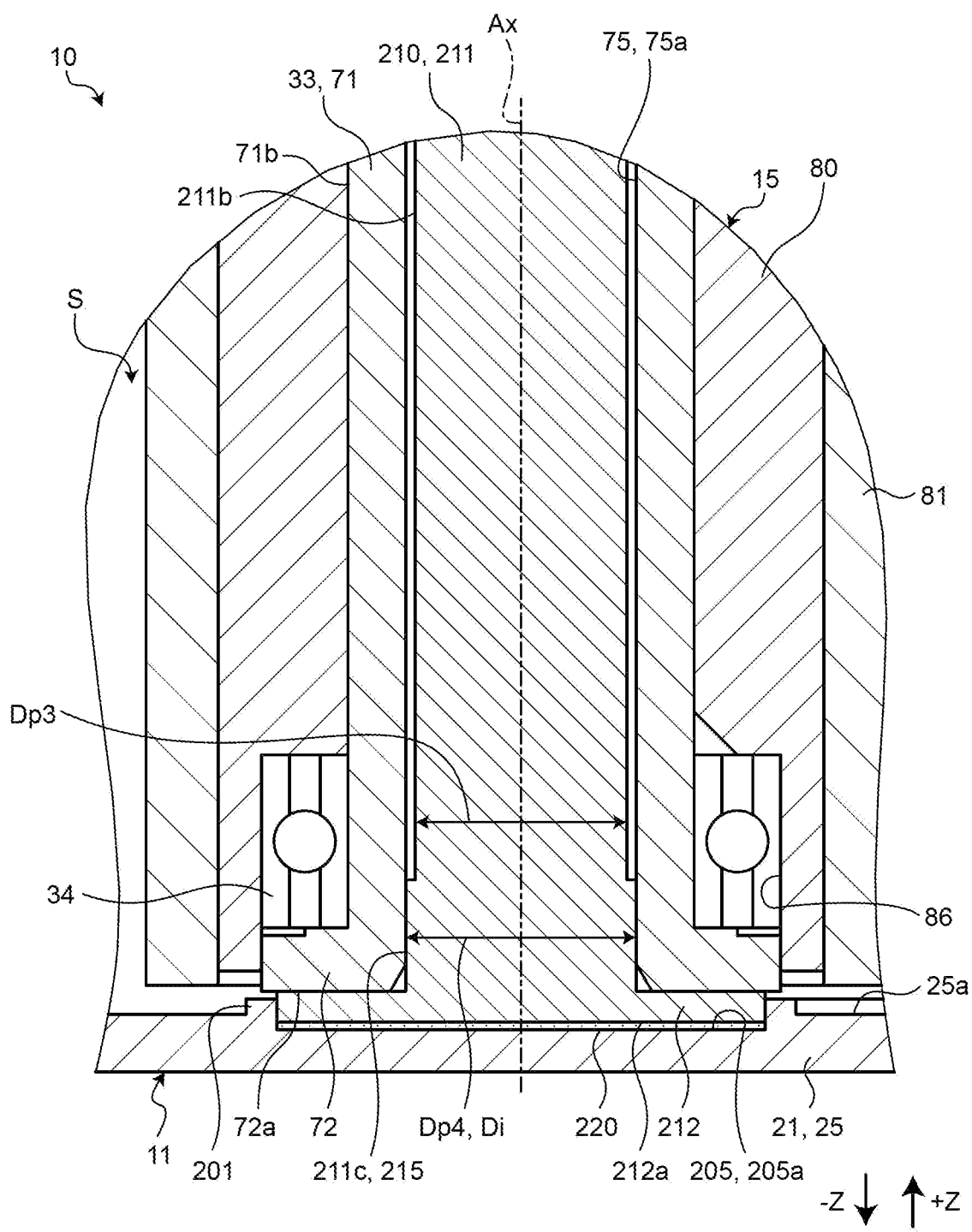
FIG. 5 is an exemplary cross-sectional view illustrating a portion of the HDD around a protrusion of the second embodiment.

As illustrated in FIG. 5, the support column 211 further includes a step 215. The step 215 protrudes from the outer peripheral surface 211b outward in the radial direction. The outer peripheral surface 211c is a substantially cylindrical curved surface provided on the step 215 and faces outward in the radial direction.

The step 215 and the outer peripheral surface 211c are provided in the vicinity of an end of the support column 211 in the −Z direction. Note that the step 215 and the outer peripheral surface 211c may be separated from the end of the support column 211 in the −Z direction in the direction.

The outer peripheral surface 211b has a diameter Dp1 smaller than a diameter Dp4 of the outer peripheral surface 211c. The diameter Dp3 of the outer peripheral surface 211b may not be constant. In this case, the diameter Dp3 is the maximum diameter of the outer peripheral surface 211b. The diameter Dp4 of the outer peripheral surface 211c is substantially constant.

As illustrated in FIG. 4, the support column 211 is provided with a screw hole 217. The screw hole 217 extends from the end surface 211a substantially the −Z direction. The screw hole 217 has an inner surface provided with female threads. The screw hole 217 does not pass through the column 210.

As illustrated in FIG. 5, the flange 212 is located at the end of the support column 211 in the −Z direction. The flange 212 protrudes radially outward from the outer peripheral surface 211c of the support column 211. The flange 212 has an end surface 212a. The end surface 212a is at an end of the flange 212 in the −Z direction. The end surface 212a is an end surface of the column 210 in the −Z direction. The end surface 212a is a substantially circular flat surface and faces substantially the −Z direction. The end surface 212a of the flange 212 is larger than the end surface 211a of the support column 211.

The flange 212 is fitted into the recess 205. The end surface 212a of the flange 212 is bonded to the bottom surface 205a of the recess 205 with an adhesive 220. In this manner, the column 210 is attached to the base 21. Note that the flange 212 may be bonded to the bottom surface 205a with a double-sided tape, in addition to the adhesive 220, for example.

The recess 205 has an inner diameter slightly greater than a diameter of the flange 212. Because of this, the protrusion 201 surrounding; the recess 205 works to position the column 210 including the flange 212. Further, the relatively large end surface 212a of the flange 212 helps the column 210 firmly attached to the base 21.

As illustrated in FIG. 4, in the second embodiment, the screw shaft 62 of the screw 32 is fitted into the screw hole 217. Further, the cylinder 71 accommodates the column 210 in the through hole 75. The outer peripheral surfaces 211b and 211c of the support column 211 face the inner surface 75a of the through hole 75. The outer peripheral surface 211b is separated from the inner surface 75a. The outer peripheral surface 211c is in contact with the inner surface 75a to hold the cylinder 71 on the column 210.

According to the HDD 10 of the second embodiment described above, the column 210 is bonded to the bottom surface 205a of the recess 205. As such, the base 21 and the column 210 can be prevented from being deformed by press-fitting or screwing.

The cylinder 71 is provided with the inner through hole 75. The cylinder 71 accommodates the column 210 in the through hole 75 and is interposed between the column 210 and the HSA 15. The column 210 has the outer peripheral surface 211c and the flange 212. The outer peripheral surface 211c holds the cylinder 71 on the column 210 by at least partially contacting with the inner surface of the through hole 75. The flange 212 protrudes from the outer peripheral surface 211c and is bonded to the bottom surface 205a of the recess 205. That is, the column 210 is bonded to the bottom surface 205a of the recess 205 in a larger area than the area of the outer peripheral surface 211c. Thereby, the column 210 can be accurately attached to the base 21.

In the above description, "to prevent (to be prevented)" is defined as, for example, preventing the occurrence of an event, an action, or an influence, or reducing the degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
  a plurality of magnetic disks;
  a casing including
    a base having an inner space in which the plurality of magnetic disks is accommodated, and
    a first cover attached to the base to close the space;
  a column with a screw hole, located in the space and attached to the base by being fitted into a recess formed in the base;
  a rotary component located in the space, surrounding the column, and configured to rotate about the column;
  a screw fitted into the screw hole through the first cover; and
  a cylinder with an inner through hole, wherein
  the base includes a bottom surface facing the first cover, and a protrusion protruding from the bottom surface toward the first cover,
  the protrusion is provided with the recess,
  the cylinder accommodates the protrusion and the column in the through hole and is interposed between the column and the rotary component,
  the protrusion has:

a first outer peripheral surface spaced apart from an inner surface of the through hole and facing the inner surface of the through hole; and a second outer peripheral surface being closer to the bottom surface than the first outer peripheral surface, to hold the cylinder on the protrusion by contacting with the inner surface of the through hole, the column includes a fitting part fitted into the recess, and the second outer peripheral surface is spaced apart from the fitting part toward the bottom surface.

2. The disk device according to claim 1, wherein in a direction along an axis of the column, a distance between the second outer peripheral surface and the fitting part is greater than a length of the fitting part.

3. The disk device according to claim 1, wherein the fitting part is press-fitted into the recess.

* * * * *